United States Patent
Gröbner

(10) Patent No.: US 9,821,876 B2
(45) Date of Patent: Nov. 21, 2017

(54) FORK TOP BRIDGES FOR CONNECTING STEER TUBES OF A MOTORCYCLE OR BICYCLE

(71) Applicant: GRÖBNER FERTIGUNGS GMBH, Petting (DE)

(72) Inventor: Andreas Gröbner, Waging am See (DE)

(73) Assignee: GRÖBNER FERTIGUNGS GMBH, Petting (DE)

( * ) Notice: Subject to any disclaimer, the term of this patent is extended or adjusted under 35 U.S.C. 154(b) by 0 days.

(21) Appl. No.: 15/032,862

(22) PCT Filed: Oct. 16, 2014

(86) PCT No.: PCT/EP2014/002803
§ 371 (c)(1),
(2) Date: Apr. 28, 2016

(87) PCT Pub. No.: WO2015/062707
PCT Pub. Date: May 7, 2015

(65) Prior Publication Data
US 2016/0264210 A1 Sep. 15, 2016

(30) Foreign Application Priority Data
Oct. 31, 2013 (DE) .......................... 10 2013 018 337

(51) Int. Cl.
*B62K 21/04* (2006.01)

(52) U.S. Cl.
CPC .................................... *B62K 21/04* (2013.01)

(58) Field of Classification Search
CPC ........................................................ B62K 21/04
USPC .................................. 280/279, 280; 403/119
See application file for complete search history.

(56) References Cited

U.S. PATENT DOCUMENTS

| | | | | |
|---|---|---|---|---|
| 3,910,600 A | * | 10/1975 | Sprick ................... | B62K 21/04 280/280 |
| 6,976,691 B1 | * | 12/2005 | Song ..................... | B62K 21/04 280/279 |
| 7,118,302 B1 | * | 10/2006 | Durham ................ | B62K 21/04 280/276 |
| 7,690,128 B1 | * | 4/2010 | Thompson ............ | G01B 5/255 33/533 |
| 7,832,752 B2 | * | 11/2010 | Czysz ................... | B62K 21/06 280/275 |

(Continued)

FOREIGN PATENT DOCUMENTS

DE  20 2013 005 952  9/2013
EP  1 946 863  7/2008

(Continued)

OTHER PUBLICATIONS

International Preliminary Resort on Patentability issued in PCT/EP2014/002803 dated May 3, 2016.

(Continued)

*Primary Examiner* — Jacob Knutson
(74) *Attorney, Agent, or Firm* — Nixon & Vanderhye P.C.

(57) ABSTRACT

According to the invention, a fork crown for connecting fork tubes of a motorbike or bicycle includes clamping collars with at least two clamping tongues which extend from a collar base in opposite peripheral directions.

12 Claims, 3 Drawing Sheets

(56) References Cited

U.S. PATENT DOCUMENTS

| | | | |
|---|---|---|---|
| 2006/0279062 A1* | 12/2006 | Vincenzo | B62K 21/04 280/280 |
| 2007/0013163 A1* | 1/2007 | Costa | B62K 21/04 280/280 |
| 2012/0235378 A1 | 9/2012 | Wagner | |

FOREIGN PATENT DOCUMENTS

| | | |
|---|---|---|
| EP | 2 570 338 | 3/2013 |
| WO | WO 2006/011174 | 2/2006 |
| WO | WO 2010/080291 | 7/2010 |

OTHER PUBLICATIONS

International Search Report for PCT/EP2014/002803, dated Feb. 11, 2015, 5 pages (w/ translation).

\* cited by examiner

FORK TOP BRIDGES FOR CONNECTING STEER TUBES OF A MOTORCYCLE OR BICYCLE

This application is the U.S. national phase of International Application No. PCT/EP2014/002803 filed 16 Oct. 2014, which designated the U.S. and claims priority to DE Patent Application No. 10 2013 018 337.5 filed 31 Oct. 2013, the entire contents of each of which are hereby incorporated by reference.

The invention relates to a fork top bridge for connecting steer tubes of a motorcycle or bicycle as defined by the preamble to claim 1.

Fork top bridges of this type typically have clamping collars in the end areas opposite one another, into which clamping collars the two steer tubes of a front wheel fork of a motorcycle or bicycle are introduced and firmly clamped. Besides one-piece clamping collars, which have only a single clamping tongue, two-piece clamping collars are also known, in which two clamping tongues are located one above the other in the axial direction and can be clamped shut by means of separate clamping screws. As a result, the clamping collars can be clamped shut equally in the upper and lower peripheral area and thus over their entire height. The clamping tongues extend, beginning at the collar base, in the same direction in the circumferential direction; the flange bases through which the clamping screw extends are located one above the other.

In the known clamping collars, it is disadvantageous that whenever a torsional moment acts on the clamped-in steer tube and the steer tube rotates about its longitudinal axis, are self-inhibiting in only one direction of rotation, that is, they pull shut only in one direction of rotation. If a torque acts on the steer tube in the opposite circumferential direction, a frictional force acts on the clamping tongue or clamping tongues, which force seeks to move the clamping tongue or clamping tongues in the opening direction. Such rotary forces thus have the tendency of loosening the fixed clamping seat between the clamping collar and the steer tube.

The attempt is made to counteract this unwanted effect by clamping the collars shut with a suitably high force. However, the steer tube may become deformed as a result. Such a deformation, however, worsens the function of the fork, which is typically embodied as a telescoping fork, since the inner tube then no longer slides easily, as desired, in the outer tube.

The object of the invention is to create a fork top bridge of the type mentioned at the outset with a clamping collar which securely and reliably holds the clamped-in steer tube with the least possible clamping forces and in so doing reduces the deformation of the steer tube.

This object is attained according to the invention by a fork top bridge having the features of claim 1. Advantageous embodiments of the invention are described in the further claims.

The fork top bridge of the invention has at least one clamping collar with a first clamping tongue and a second clamping tongue, and the first clamping tongue extends outward from the collar base in a first circumferential direction, while the second clamping tongue extends outward from the collar base in a second circumferential direction, which is the opposite of the first circumferential direction.

Because the two clamping tongues extend in opposite circumferential directions, the clamping collar always has one clamping tongue which pulls closed if the steer tube makes a rotary motion about its longitudinal axis, regardless of rotational direction of this rotary motion. The clamping-shut forces of the clamping collar can therefore be reduced without impairing the reliable retention of the steer tube in the collar. These slight clamping-shut forces result in reduced deformation of the steer tube. In addition, the free ends of the two clamping tongues that move the most as the clamping collar is clamped shut are also offset in the circumferential direction. As a result, the steer tube likewise is uniformly stressed when the clamping collar is being clamped shut and the deformation of the steer tube is reduced. The highly reduced deformation of the steer tube ensures a smoothly moving, very precise function of the telescoping fork.

Advantageously, the clamping tongues each extend over a circumferential area of 100° to 260°, in particular 170° to 190°, along the circumference of the clamping collar. It is especially advantageous if the clamping tongues extend over a circumferential area of approximately 180° along the circumference of the clamping collar. As a result, because of the flexibility of the clamping tongues, the clamping forces can be transmitted especially effectively and uniformly to the steer tube, and at the same time the clamping-shut devices of the two clamping tongues are offset from one another in the circumferential direction so much that the free ends of the clamping tongues, which move the most, are located relatively far apart.

Advantageously, the clamping collar has a slot, which has an upper axial slot segment, a lower axial slot segment which is offset from the upper axial slot segment in the circumferential direction by 170° to 190°, in particular 180°, and a slot segment extending in the circumferential direction, which segment connects the upper and lower axial slot segments and divides the first clamping tongue from the second clamping tongue. As a result, the clamping collar can be produced relatively simply from a single, tubular part.

Advantageously, the collar base and clamping tongues are embodied in one piece with the bridge body. As a result, an especially stable, rigidly connected arrangement is obtained. Under lesser stresses, for instance in the bicycle field, however, it is also conceivable to produce the clamping collar separately from the bridge body and to secure it afterward to the bridge body by means of suitable connecting means.

One exemplary embodiment of the invention will be described as an example in further detail below in conjunction with the drawings.

The invention will be described below in terms of a fork top bridge arrangement or fork top bridge which is used in motorcycle forks. However, its use in bicycles is equally possible.

Figure 1:
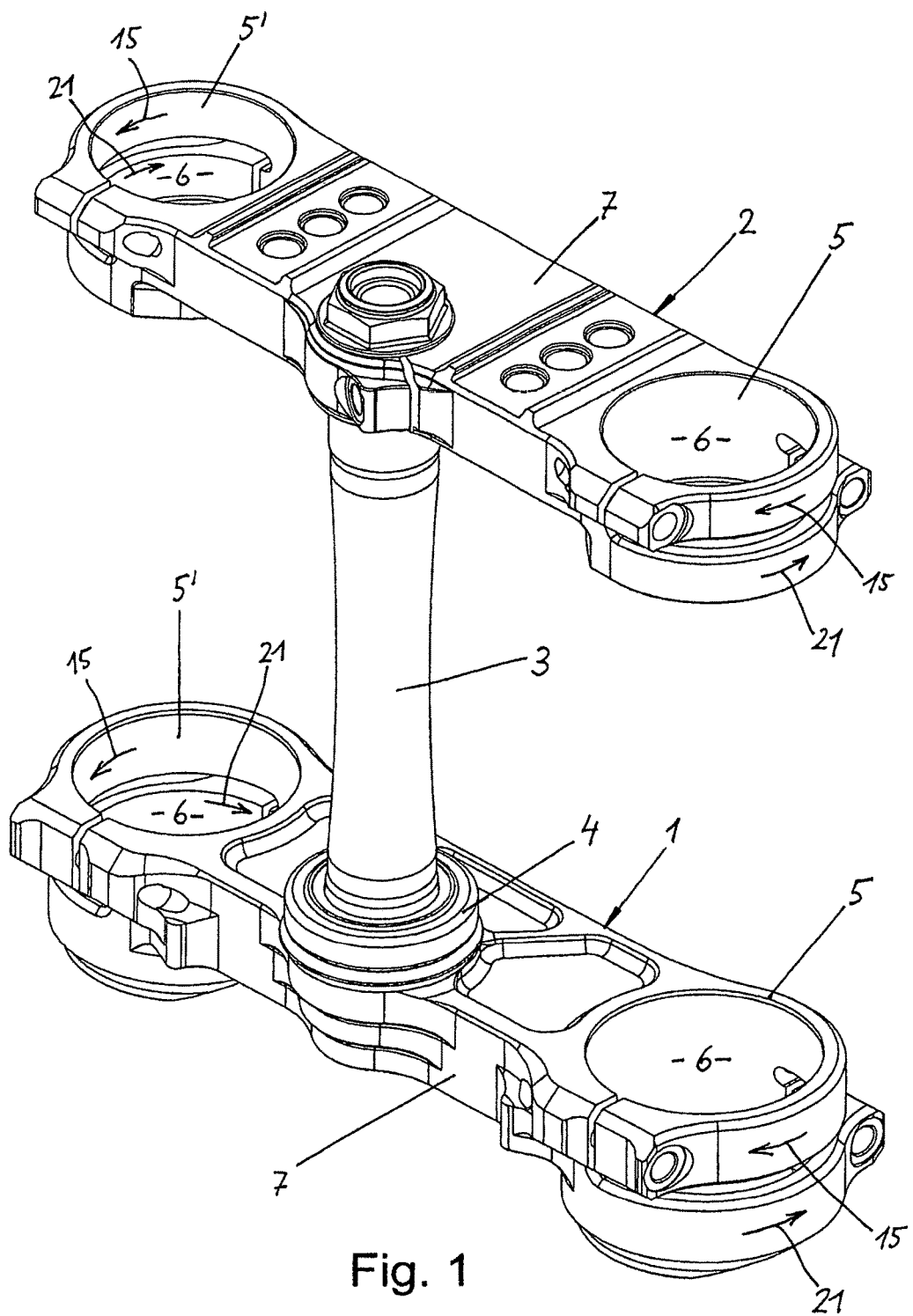
FIG. 1 shows a three-dimensional view of a fork top bridge arrangement having two fork top bridges according to the invention.

In FIG. 1, a fork top bridge arrangement having a lower fork top bridge 1 and an upper fork top bridge 2, which are joined to one another by means of a central steering head shaft 3, can be seen.

In the lower end area of the steering head shaft 3, a lower bearing ring 4 is provided, which, together with an upper bearing ring not shown, forms a bearing arrangement with which the fork top bridge arrangement and thus the entire fork of the motorcycle is supported rotatably in a steering tube, not shown, of a motorcycle frame.

Each fork top bridge 1, 2 has two clamping collars 5, 5', which are located on the opposite ends of the fork top bridges 1, 2. The clamping collars 5, 5' are each embodied essentially cylindrically or in tubular fashion and enclose receptacle chambers 6, through which the steer tubes that are to be clamped extend. The longitudinal axis of the upper clamping collar 5 is aligned with the longitudinal axis of the lower clamping collar 5, while the longitudinal of the upper clamping collar 5' is aligned with the longitudinal axis of the lower clamping collar 5'. The steer tubes retained by the fork top bridge arrangement therefore extend parallel to one another.

Figure 3:
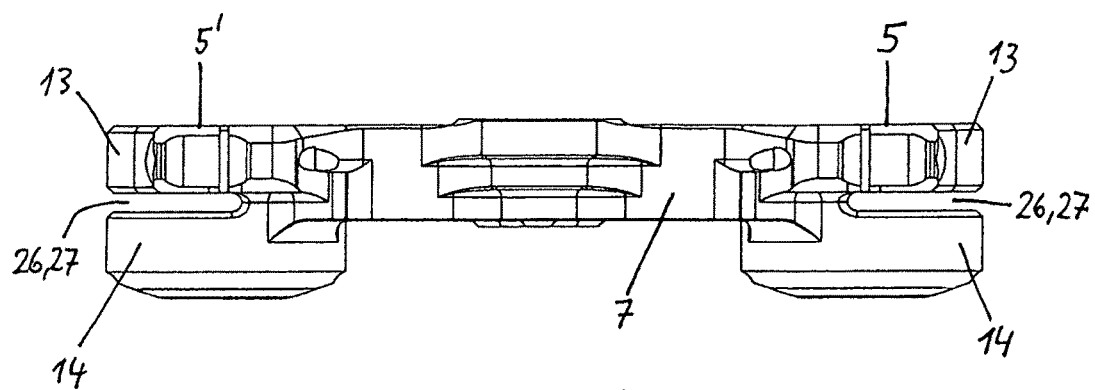
FIG. 3 is a front view of the fork top bridge of FIG. 2.
Figure 4:
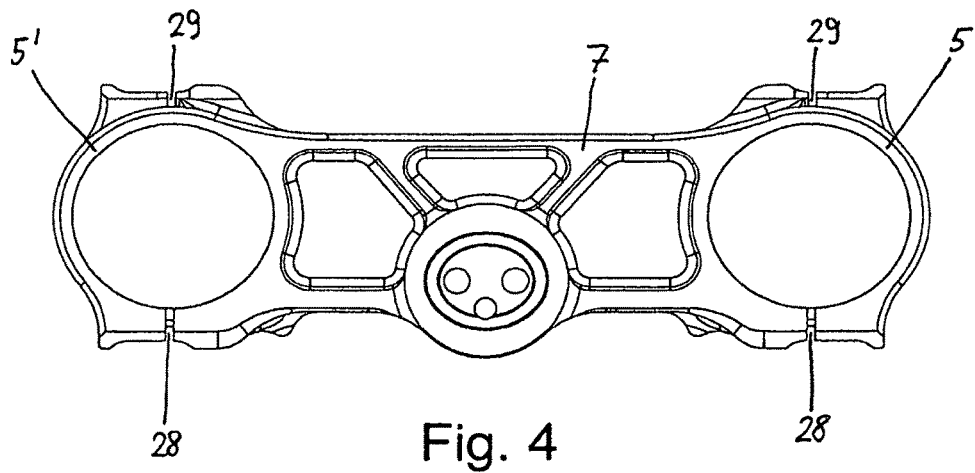
FIG. 4 is a plan view on the fork top bridge of FIG. 2.

Below, the construction of the lower fork top bridge 1 will be described in further detail in terms of FIGS. 2 through 4. The upper fork top bridge 2 is constructed identically or quite similarly with regard to the parts that are essential to the invention.

Figure 2:
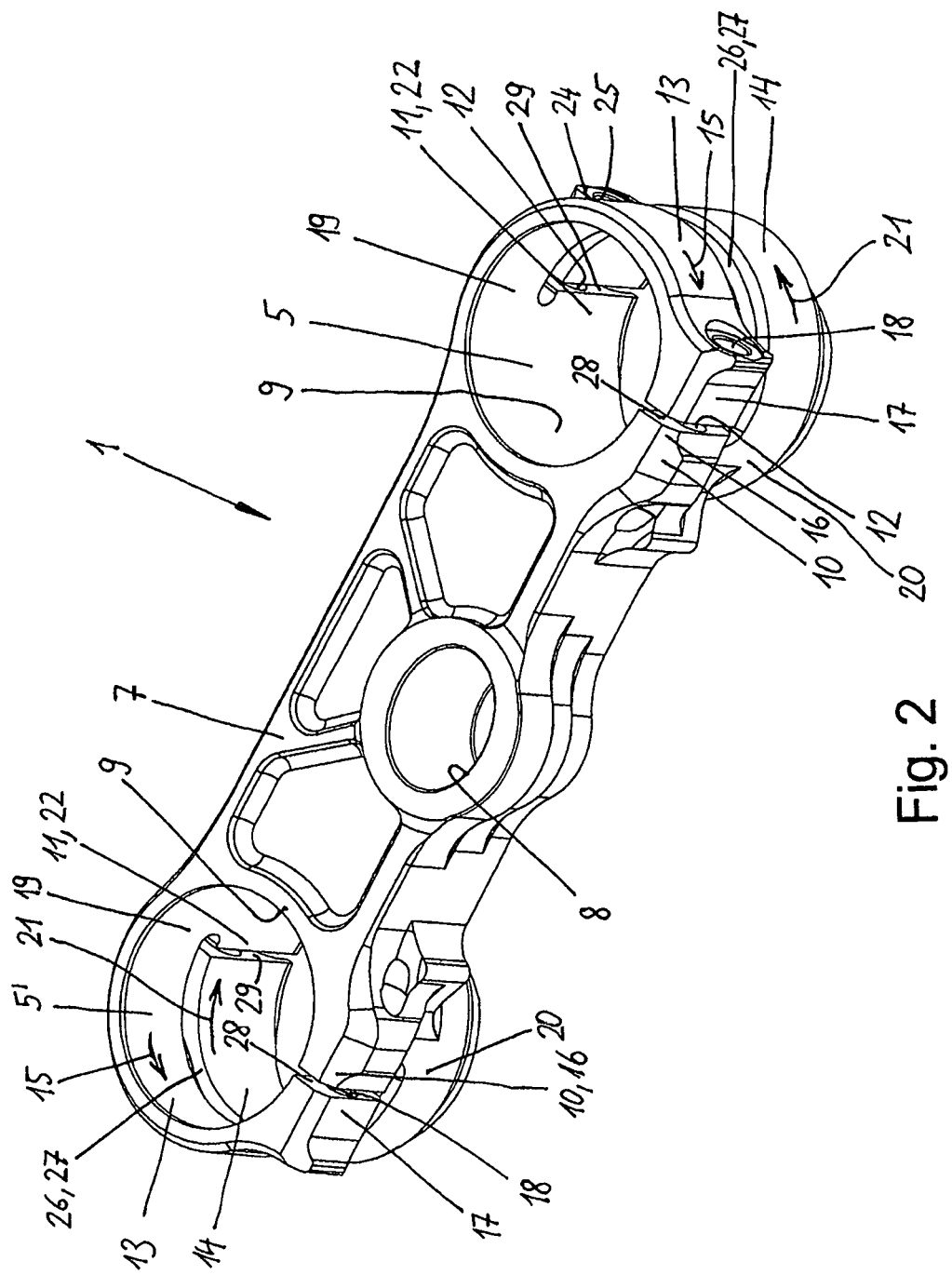
FIG. 2 shows the lower fork top bridge of FIG. 1 by itself.

As can be seen from FIG. 2, the two clamping collars 5, 5' of the fork top bridge 1 are integrally formed onto a bridge body 7, which is located between them and is embodied in as stable and rigidly connecting a way as possible. An opening 8 is provided centrally in the bridge body 7; it serves to receive and secure the lower end area of the steering head shaft 3.

The two clamping collars 5, 5' are embodied in one piece with the bridge body 7 and comprise the same material. Expediently, this material is a high-strength aluminum alloy, or some other metal, such as steel. The material is selected such that on the one hand, the fork top bridge has the desired great strength and stability, and on the other, the clamping collars 5, 5' have a certain flexibility, so that they can be clamped shut and opened.

Both clamping collars 5, 5' are located symmetrically to the vertical center plane of the fork top bridge 1 and moreover are embodied identically. The clamping collars 5, 5' have a dimensionally stable collar base 9 in the transition area to the bridge body 7. This collar base 9 extends, in the exemplary embodiment shown, over approximately 180° of the total circumference of the clamping collars 5, 5'. The surface of the collar base 9 that demarcates the receptacle chamber 6 is thus semicircular, in the plan view shown in FIG. 4; it extends over the entire axial length of the clamping collar 5, 5'.

Since the two clamping collars 5, 5' have the same construction, only the clamping collar 5 will be described in further detail below. This description applies accordingly to the clamping collar 5'.

As can be seen from FIG. 2, the collar base 9 has a radially outward-protruding first flange base 10, which is located in the upper half of the clamping collar 5 and in a first circumferential end area 16 of the collar base 9, and a radially outward-protruding second flange base 11, which is located in the lower half of the collar base 9 and in an opposite, second circumferential end area 22 of the collar base 9. Both flange bases 10, 11 each have a respective threaded bore 12, which serves to screw in a clamping screw, not shown.

Each clamping collar 5 furthermore has a clamping tongue assembly with a first, upper clamping tongue 13 and a lower, second clamping tongue 14 that is movable separately from the first. The first clamping tongue 13 extends from a third circumferential end area 19 of the collar base 9 in semicircular fashion in a first circumferential direction 15 into the vicinity of the opposed first circumferential end area 16 of the collar base 9, that is, into the vicinity of the first flange base 10.

On the free end area of the first clamping tongue 13, a radially outward-protruding third flange base 17 is provided, having a bore 18 that is aligned with the threaded bore 12 and that serves to allow the passage through it of the clamping screw, not shown. The second clamping tongue 14 extends in a second circumferential direction 21, which is the opposite of the first circumferential direction 15, from a third circumferential end area 20 of the collar base 9, which area is located below the first circumferential end area 16, to the vicinity of the second circumferential end area 22 of the collar base 9, which area is located below the third circumferential end area 19 and has the second flange base 11. Moreover, in the free circumferential end area of the second clamping tongue 14, a radially outward-projecting fourth flange base 24 is provided, having a bore 25 that is aligned with the threaded bore 12 and serves to allow the passage through it of a second clamping screw, not shown, with which the free end of the second clamping tongue 14 can be pulled against the collar base 9 in order to firmly clamp the steer tube. The two flange bases 10, 17 thus together with a clamping screw form a first clamping-shut device, with which the first clamping tongue 13 can be pulled in the first circumferential direction 15 in order to firmly clamp a steer tube, while the flange bases 11, 24, together with a clamping screw, form a second clamping-shut device, with which the second clamping tongue 14 can be pulled in the second circumferential direction 21, which is the opposite of the first circumferential direction 15, in order to firmly clamp the steer tube in the immediate axial vicinity of the first clamping tongue 13.

The first clamping tongue 13 is divided from the second clamping tongue 14 by a slot 26, which has a slot segment 27 extending in the circumferential direction of the clamping collar 5, an upper axial slot segment 28 extending in the axial direction of the clamping collar 5, and a lower axial slot segment 29, extending in the axial direction of the clamping collar 5, which is located in the opposite circumferential area of the clamping collar 5. Thus the slot has an S-shaped course.

Within the scope of the invention, many variations are possible. For instance, it is possible for the clamping collars 5, 5' to have more than two clamping tongues 13, 14, for instance three or four clamping tongues. In that case, it is advantageous if one clamping tongue each extends in the opposite direction from the adjacent clamping tongue. It is furthermore possible that the vertical slot segments 28, 29 are not offset from one another by 180°, but by a different angular amount, such as 100° to 260°, in particular 170° to 190°. Expediently, both clamping collars 5, 5' are embodied identically. However, different embodiments are fundamentally also possible.

The invention claimed is:

1. A fork top bridge for connecting steer tubes of a motorcycle or bicycle comprising a bridge body and two clamping collars integrally formed onto or secured to the bridge body, for clamping the steer tubes, wherein each of the two clamping collars includes:
   a collar base; and
   a clamping tongue assembly comprising a first clamping tongue and a second clamping tongue, wherein
      the first clamping tongue and the second clamping tongue are located in line with one another and separated from each other in an axial direction of the clamping collar,
      the first clamping tongue and the second clamping tongue extend outward circumferentially from the collar base, the first clamping tongue and the second clamping tongue enclose, together with the collar base, a receptacle chamber for one of the steer tubes, the first clamping tongue and the second clamping tongue each have a circumferential end area, which is brought closer to the collar base, the first clamping tongue extends from the collar base outward in a first circumferential direction, and the second clamping tongue extends outward from the collar base in a second circumferential direction, which is the opposite of the first circumferential direction.

2. The fork top bridge of claim 1, wherein the clamping tongues each extend circumferentially in a range of 100° to 260°.

3. The fork top bridge of claim 2, wherein the clamping tongues each extend circumferentially in the range of 170° to 190°.

4. The fork top bridge of claim 1, wherein the clamping collar has a slot, wherein the slot comprises an upper axial slot segment, a lower axial slot segment that is circumferentially offset from the upper axial slot segment by 170° to 190°, and a circumferential slot segment extending in the circumferential direction, wherein the circumferential segment connects the upper and lower axial slot segments and divides the first clamping tongue from the second clamping tongue.

5. The fork top bridge of claim 4, wherein the lower axial slot segment is circumferentially offset from the upper axial slot segment by 180°.

6. The fork top bridge of claim 1, wherein the collar base and clamping tongues are embodied in one piece with the bridge body.

7. A fork bridge arrangement comprising a first fork top bridge, a second fork top bridge, and a central steering head shaft joining the first fork top bridge to the second fork top bridge, wherein at least one of the first fork top bridge and the second fork top bridge comprises a bridge body and two clamping collars integrally formed onto or secured to the bridge body, for clamping the steer tubes, wherein each of the two clamping collars includes a collar base, and a clamping tongue assembly comprising a first clamping tongue and a second clamping tongue, wherein the first clamping tongue and the second clamping tongue are located in line with one another and separated from each other in an axial direction of the clamping collar, the first clamping tongue and the second clamping tongue extend outward circumferentially from the collar base, the first clamping tongue and the second clamping tongue enclose, together with the collar base, a receptacle chamber for one of the steer tubes, the first clamping tongue and the second clamping tongue each have a circumferential end area, which is brought closer to the collar base, the first clamping tongue extends from the collar base outward in a first circumferential direction, and the second clamping tongue extends outward from the collar base in a second circumferential direction, which is the opposite of the first circumferential direction.

8. The fork bridge arrangement of claim 7, wherein the clamping tongues each extend circumferentially in a range of 100° to 260°.

9. The fork top bridge of claim 8, wherein the clamping tongues each extend circumferentially in the range of 170° to 190°.

10. The fork bridge arrangement of claim 7, wherein the clamping collar has a slot, wherein the slot comprises an upper axial slot segment, a lower axial slot segment that is circumferentially offset from the upper axial slot segment by 170° to 190°, and a circumferential slot segment extending in the circumferential direction, wherein the circumferential segment connects the upper and lower axial slot segments and divides the first clamping tongue from the second clamping tongue.

11. The fork top bridge of claim 10, wherein the lower axial slot segment is circumferentially offset from the upper axial slot segment by 180°.

12. The fork bridge arrangement of claim 7, wherein the collar base and clamping tongues are embodied in one piece with the bridge body.

* * * * *